United States Patent [19]

Onder

[11] 4,061,623
[45] Dec. 6, 1977

[54] PREPARATION OF POLYAMIDEIMIDE FROM ORGANIC DIISOCYANATE WITH ALKALI METAL SALT OF ALCOHOL AS CATALYST

[75] Inventor: Besir K. Onder, North Haven, Conn.

[73] Assignee: The Upjohn Company, Kalamazoo, Mich.

[21] Appl. No.: 735,758

[22] Filed: Oct. 26, 1976

Related U.S. Application Data

[62] Division of Ser. No. 521,744, Nov. 7, 1974, Pat. No. 4,001,186.

[51] Int. Cl.$^2$ .................. C08G 18/22; C08G 73/14
[52] U.S. Cl. .................. 260/78 TF; 260/47 CZ; 260/47 CB; 260/63 N; 260/65
[58] Field of Search .......... 260/78 TF, 47 CP, 63 N, 260/65

[56] References Cited

U.S. PATENT DOCUMENTS

| 3,108,975 | 10/1963 | Lambert et al. | 260/2.5 AT |
|---|---|---|---|
| 3,300,420 | 1/1967 | Frey | 260/78 TF |
| 3,489,696 | 1/1970 | Miller | 260/78 TF |
| 3,562,217 | 2/1971 | Zalewski et al. | 260/78 TF |
| 3,620,987 | 11/1971 | McLaughlin | 260/78 TF |
| 3,658,773 | 4/1972 | Zecher et al. | 260/78 TF |
| 3,682,860 | 8/1972 | Yoda et al. | 260/78 TF |
| 3,701,756 | 10/1972 | Carleton et al. | 260/78 TF |
| 3,803,100 | 4/1974 | Izumi et al. | 260/78 TF |
| 3,853,813 | 12/1974 | Edelman et al. | 260/78 TF |
| 3,873,503 | 3/1975 | Hoheisel | 260/78 TF |

*Primary Examiner*—Harold D. Anderson
*Attorney, Agent, or Firm*—James S. Rose; Denis A. Firth

[57] ABSTRACT

The use of certain catalysts provide for an improved process for the preparation of soluble polyimides, polyamides, and polyamideimides. The catalysts are alkali metal salts of formula MOR, wherein R represents alkyl or aryl and M represents an alkali metal. The improved process comprises reacting organic diisocyanates with polycarboxylic compounds consisting of tetracarboxylic acids or the intramolecular dianhydrides thereof, tricarboxylic acids or the monoanhydrides thereof, dicarboxylic acids, and mixtures thereof, in the presence of said catalysts. The polymers are obtained in solution at low reaction temperatures and short reaction times thereby avoiding side-reactions which otherwise would be detrimental to polymer molecular weight and ultimate polymer properties.

12 Claims, No Drawings

PREPARATION OF POLYAMIDEIMIDE FROM ORGANIC DIISOCYANATE WITH ALKALI METAL SALT OF ALCOHOL AS CATALYST

CROSS REFERENCE TO RELATED APPLICATION

This application is a division of copending application Ser. No. 521,744 filed Nov. 7, 1974, now U.S. Pat. No. 4,001,186.

BACKGROUND OF THE INVENTION

1. Field of the Invention

This invention relates to a novel process and is more particularly concerned with a novel process for the preparation of polyimides, polyamides, and copolymeric mixtures thereof.

2. Description of the Prior Art

The reaction of diisocyanates with dicarboxylic acids and dianhydrides in solution to form polyamides and polyimides is well known in the polymer art; see for example U.S. Pat. No. 3,592,789 wherein there is disclosed the formation of coating solutions by reacting a diisocyanate, such as 4,4'-methylenebis(phenylisocyanate), with trimellitic anhydride in dimethylformamide at about 150° F to 300° F, and conversion to the cured polymer at 200° C to 420° C. U.S. Pat. No. 3,541,038 discloses the polymerization of trimellitic anhydride with diisocyanates at elevated temperatures; and U.S. Pat. No. 3,708,458 discloses the formation of polyimides requiring long reaction times. U.S. Pat. No. 3,701,756 teaches the use of certain hydroxides and ureas as catalysts for the reaction of isocyanates with anhydrides, however such catalysts are extremely difficult to remove from the products so obtained. It is known to those skilled in the polymer art that the reaction of diisocyanates with dicarboxylic acids in solution to form polyamides requires even higher temperatures than those called for in the prior art hereinbefore cited; see for example U.S. Pat. No. 3,642,715.

It has been well established that isocyanates react with some common dipolar aprotic solvents such as dimethylformamide, dimethylacetamide, N-methylpyrrolidone, and the like, at elevated temperatures. See M. R. Weiner, J. Org. Chem. 25, 2245 (1960) and S. Terney et al., J. Polym. Sci., Part A-1,8, 683 (1970). For example, heating of phenylisocyanate in dimethylformamide at only 150° C for 150 minutes gives a 35% yield of N-phenyl-N', N'-dimethylformamidine and 30% of a cycloaddition adduct derived from a further reaction of the formamidine with four moles of phenylisocyanate. The side reactions arising during polymerizations involving the use of isocyanates in such solvents, have already been considered; see The Reaction of Isocyanates with Polar Solvents, by H. Ulrich, paper presented at the University of Detroit, 1974 Polymer Conference Series. The side reactions easily lead to chain termination (i.e., lowering of polymer molecular weight), or crosslinking, and incorporation of units other than amide or imide into the polymer chain, all of which are highly undesirable when high molecular weight, linear polymers are desired.

I have now found a process for carrying out the polymerization reactions hereinbefore described and known from the prior art, said process being free of the difficulties described hereinabove. The novel process of the present invention provides for lower polymerization temperatures, and shorter polymerization times, when compared to the prior art. As an added advantage to flow from the use of lower reaction temperatures, problems arising from possible solvent - isocyanate interaction have been eliminated. Therefore the soluble polymers obtained by the process of the present invention are characterized by having excellent molecular weight.

SUMMARY OF THE INVENTION

This invention comprises a process for preparing an essentially linear, solvent soluble, polyimide, polyamide, or polyamideimide by the condensation of an organic diisocyanate with the appropriate polycarboxylic acid derivative in said solvent, the improvement which comprises carrying out said process in the presence of a catalytic amount of a compound MOR (I) wherein R represents alkyl or aryl, and M is an alkali metal.

The term "alkali metal" means sodium, potassium, and lithium. The term "alkyl" means alkyl having from 1 to 18 carbon atoms, inclusive, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, and isomeric forms thereof. A preferred range for "alkyl" is that wherein the carbon content is within the range of "lower alkyl" which means alkyl having from 1 to 8 carbon atoms inclusive. The term "aryl" means the radical obtained by removing one nuclear hydrogen atom from an aromatic hydrocarbon and is inclusive of phenyl, tolyl, xylyl, naphthyl, biphenylyl, and the like.

The term "solvent" means a dipolar aprotic solvent.

The term "appropriate polycarboxylic acid derivative" means a difunctional polycarboxylic compound containing two groups available to react with the diisocyanate regardless of whether they be two carboxylic acid groups, two intramolecular carboxylic anhydride groups (or the free carboxylic acids thereof), or one free carboxylic acid group with one intramolecular anhydride group (or the free carboxylic acids thereof).

DETAILED DESCRIPTION OF THE INVENTION

The process of the invention is applicable to the preparation of any polyimide, polyamide, or polyamideimide which is soluble, at least to the extent of about 5 percent by weight, in the reaction solvent used in its preparation. Such polyimides, polyamides, and polyamideimides are a well known class in the art, see for example: U.S. Pat. Nos. 3,063,966, 3,541,038, 3,592,789, 3,642,715, 3,692,740, 3,696,077, 3,708,458, 3,787,367.

The novel feature of the process of the invention lies in the use of the particular catalyst set forth above. The procedure employed in carrying out the process of the invention is essentially that employed hitherto in the particular condensation with the notable exception that the aforesaid catalyst is always present in the reaction mixture.

The process of the invention is accomplished in the presence of a catalytic amount of at least one compound of formula (I). By catalytic amount is meant an amount less than 1 mole per mole of isocyanate employed. The amount of compound (I) employed is advantageously from about 0.001 mole to about 0.2 mole per mole of isocyanate, and preferably is from about 0.002 mole to about 0.02 mole per mole of isocyanate. Compound (I)

in excess of the proportions set forth can be employed, if desired, but will afford no additional advantage.

The catalysts of formula (I) defined hereinbefore include the well known alkali metal alkoxides, phenoxides, naphthoxides, and the like. The majority of said compounds are commercially available, or they can be easily prepared from the appropriate alcohol and an alkali metal, such as sodium, potassium, and lithium, in an inert solvent followed by removal of the solvent (see, Experiments in Organic Chemistry, L. F. Fieser, p. 384, 1941, D. C. Heath and Co., New York, N.Y.) Typical examples of catalysts of formula (I) include: sodium methoxide, potassium methoxide, lithium methoxide, sodium ethoxide, potassium ethoxide, lithium ethoxide, sodium butoxide, potassium butoxide, lithium butoxide, sodium octoxide, potassium octoxide, lithium octoxide, potassium nonoxide, potassium tetradecoxide, potassium hexadecoxide, potassium heptadecoxide, potassium octadecoxide, sodium tert-butoxide, sodium isopropoxide, potassium tert-pentoxide, sodium phenoxide, potassium phenoxide, lithium phenoxide, sodium naphthoxide, potassium naphthoxide, lithium naphthoxide, and the like. A preferred group of catalysts of formula (I) consist of lithium methoxide, lithium phenoxide, and sodium methoxide. A particularly preferred catalyst of formula (I) is sodium methoxide.

The process of the present invention is accomplished by bringing together in solution, under anhydrous conditions, a difunctional polycarboxylic compound, an organic diisocyanate and a catalytic amount of a compound of formula (I). It will be recognized by those skilled in the art that reasonable precautions to exclude moisture should be exercised because of the tendency for isocyanates to react with water. Such precautions include the use of dry solvents, dry apparatus, and carrying out the reaction under an inert atmosphere, i.e., nitrogen. The reactants and conditions will be defined in detail hereinafter. In a preferred embodiment of the present invention the difunctional polycarboxylic compound and catalyst are dissolved in a dipolar aprotic solvent and the diisocyanate added thereto while the solution is being heated and stirred. The stirring assists in achieving homogenity and advantageously aids in the removal of the carbon dioxide formed during the polymerization reaction. While the procedure as set forth above is a preferred embodiment, it is to be understood that the process of the present invention can also be readily accomplished by the initial admixture in solvent of all the ingredients which, upon heating, form the corresponding polymers in solution. In a most preferred embodiment, the diisocyanate is added, as a solution dissolved in a dipolar aprotic solvent, to the heated solution comprising the polycarboxylic compound and the catalyst of formula (I).

The process of the present invention is advantageously conducted at elevated temperatures from about 40° C to about 140° C and preferably from about 60° C to about 130° C. Higher reaction temperatures can be employed, however, such higher temperatures offer no advantage and insofar as solvent - isocyanate side reactions can occur thereat, their use is not particularly recommended.

The progress of the polymerization reaction is easily monitored by any suitable analytical method known to one skilled in the polymer art. A particularly suitable method is infrared analysis. The characteristic absorptions arising from the isocyanate groups of the organic diisocyanate (4.4µ), and the functional groups of the polycarboxylic compounds such as the anhydride group (5.4µ), the carboxylic acid group (5.85µ), along with the characteristic absorptions of the polymers obtained therefrom such as the imide group (5.60, 5.80, and 7.25µ), and amide group (6.00µ), allow for the facile determination of the progress and completion of the polymerization. The reaction is continued until the diisocyanate and difunctional polycarboxylic compound are no longer detectable by infrared absorption analysis.

The process of the present invention is advantageously accomplished in a period from about 2 hours to about 15 hours and preferably from about 4 hours to about 10 hours.

Illustrative of the solvents used in the present invention are dimethylsulfoxide, diethylsulfoxide, dimethylformamide, diethylformamide, dimethylacetamide, diethylacetamide, tetramethylurea, hexamethylphosphoramide, N-methylpyrrolidone, tetramethylenesulfone, and mixtures thereof. A particularly preferred group of solvents consists of dimethylformamide and N-methylpyrrolidone.

It will be appreciated by one skilled in the art that when mixtures of difunctional polycarboxylic compounds hereinafter described, are reacted with a diisocyanate, the product is a random, or block copolymer, depending on the sequence of polycarboxylic compound addition.

The difunctional polycarboxylic compound employed in the process of the invention contains at least two carboxylic moieties selected from the class consisting of free carboxy groups, anhydride groups, and mixtures thereof. Said polycarboxylic compounds are inclusive of aromatic, aliphatic, cycloaliphatic or heterocyclic polycarboxylic acids as well as the intramolecular anhydrides thereof, provided that, in the case of those anhydrides which contain a single anhydride group there is also present in the molecule a free carboxy group. As will be appreciated by one skilled in the art only those polycarboxylic acids which contain carboxy groups attached either to two adjacent carbon atoms or to two carbon atoms which are separated from each other by a single carbon or hetero-atom are capable of forming intramolecular acid anhydrides.

Any of the aforesaid polycarboxylic acids or anhydrides can be employed as the difunctional polycarboxylic compounds in the process of the invention. As will be apparent to the skilled chemist the nature of the recurring units in the resulting polymers will vary according to the structure of the starting difunctional polycarboxylic compound.

When the polycarboxylic compound is a dicarboxylic acid which is incapable of forming an intramolecular anhydride, the product formed in accordance with the process of the invention is a polyamide e.g. the product from said dicarboxylic acid and a diisocyanate will contain the recurring unit

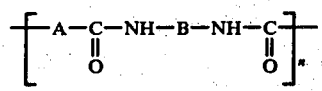

wherein A is the hydrocarbon residue of the dicarboxylic acid starting material and B is the hydrocarbon residue of the diisocyanate. On the other hand, when the polycarboxylic compound is an intramolecular anhydride which contains two anhydride moieties or contains one anhydride moiety and free carboxylic acid groups capable of intramolecular anhydride formation, the product of reaction in accordance with the process of the invention is a polyimide e.g. the product of reaction of a diisocyanate and a polycarboxylic compound containing two intramolecular anhydride groups will contain the recurring unit

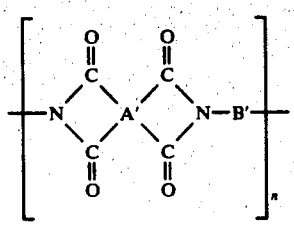

wherein A' is the hydrocarbon residue of the dianhydride and B' is the hydrocarbon residue of the diisocyanate.

Similarly where the polycarboxylic compound contains one anhydride group in addition to a free carboxylic acid group, the polymer resulting from the process of the invention will be a hybrid containing both amide and imide linkages.

All of the above types of polymers can be prepared in accordance with the novel process hereinabove described and all fall within the scope of this invention. Thus, by appropriate choice of the polycarboxylic compound it is possible to prepare any of a wide variety of polymers using the single step process of the invention.

Illustrative examples of aromatic dicarboxylic acids employed in the process of the present invention include isophthalic acid and terephthalic acid. Illustrative examples of aliphatic dicarboxylic acids employed in the present invention are malonic acid, succinic acid, glutaric acid, adipic acid, pimelic acid, suberic acid, azelaic acid, sebacic acid, 1-11-undecanedioic acid, 1,12-dodecanedioic acid and brassylic acid. Illustrative examples of cycloaliphatic dicarboxylic acids include, 1,3-cyclopentanedicarboxylic acid, and 1,4-cyclohexanedicarboxylic acid. A particularly preferred aromatic diacid is isophthalic acid and, a particularly preferred aliphatic diacid is brassylic acid.

Examples of polycarboxylic compounds which can be employed as the free carboxylic acids or intramolecular anhydrides thereof, are:

trimellitic acid and the anhydride thereof,
pyromellitic acid and the dianhydride thereof,
mellophanic acid and the anhydride thereof,
benzene-1,2,3,4-tetracarboxylic acid and the dianhydride thereof,
benzene-1,2,3-tricarboxylic acid and the anhydride thereof,
diphenyl-3,3',4,4'-tetracarboxylic acid and the dianhydride thereof,
diphenyl-2,2',3,3'-tetracarboxylic acid and the dianhydride thereof,
naphthalene-2,3,6,7-tetracarboxylic acid and the dianhydride thereof,
naphthalene-1,2,4,5-tetracarboxylic acid and the dianhydride thereof,
naphthalene-1,4,5,8-tetracarboxylic acid and the dianhydride thereof,
decahydronaphthalene-1,4,5,8-tetracarboxylic acid and the dianhydride thereof,
4,8-dimethyl-1,2,3,5,6,7-hexahydronaphthalene-1,2,5,6-tetracarboxylic acid and the dianhydride thereof,
2,6-dichloronaphthalene-1,4,5,8-tetracarboxylic acid and the dianhydride thereof,
2,7-dichloronaphthalene-1,4,5,8-tetracarboxylic acid and the dianhydride thereof,
2,3,6,7-tetrachloronaphthalene-1,4,5,8-tetracarboxylic acid and the dianhydride thereof,
phenanthrene-1,3,9,10-tetracarboxylic acid and the dianhydride thereof,
perylene-3,4,9,10-tetracarboxylic acid and the dianhydride thereof,
bis(2,3-dicarboxyphenyl)methane and the dianhydride thereof,
bis(3,4-dicarboxyphenyl)methane and the dianhydride thereof,
1,1-bis(2,3-dicarboxyphenyl)ethane and the dianhydride thereof,
1,1-bis(3,4-dicarboxyphenyl)ethane and the dianhydride thereof,
2,2-bis(2,3-dicarboxyphenyl)propane and the dianhydride thereof,
2,3-bis(3,4-dicarboxyphenyl)propane and the dianhydride thereof,
bis(3,4-dicarboxyphenyl)sulfone and the dianhydride thereof,
bis(3,4-dicarboxyphenyl)ether and the dianhydride thereof,
ethylene tetracarboxylic acid and the dianhydride thereof,
butane-1,2,3,4-tetracarboxylic acid and the dianhydride thereof,
cyclopentane-1,2,3,4-tetracarboxylic acid and the dianhydride thereof,
pyrrolidine-2,3,4,5-tetracarboxylic acid and the dianhydride thereof,
pyrazine-2,3,5,6-tetracarboxylic acid and the dianhydride thereof.
thiophen-2,3,4,5-tetracarboxylic acid and the dianhydride thereof,
and benzophenone-3,3',4,4'-tetracarboxylic acid and the dianhydride thereof.

Other anhydrides which may be employed in the practice of the invention are; the intermolecular anhydride of trimellitic acid 1,2-anhydride (see, for example U.S. Pat. No. 3,155,687), the bis-anhydrides disclosed in U.S. Pat. No. 3,277,117 [e.g. 4,4'-ethylene glycol bis-anhydro trimellitate and 4,4'-(2-acetyl-1,3-glycerol) bis-anhydro trimellitate] and the di-adducts of maleic acid or anhydride with styrene.

While any of the polycarboxylic acids and intramolecular anhydrides thereof defined and exemplified above can be employed in the preparation of the polymers of the invention, a preferred group of compounds for this purpose are intramolecular anhydrides which are derived from polycarboxylic acids having at least 3 carboxyl groups of which at least two carboxyl groups are attached directly to an aromatic nucleus in ortho-position with respect to each other. A preferred group of polycarboxylic acid intramolecular anhydrides are those selected from the class consisting of anhydrides having the following formulae

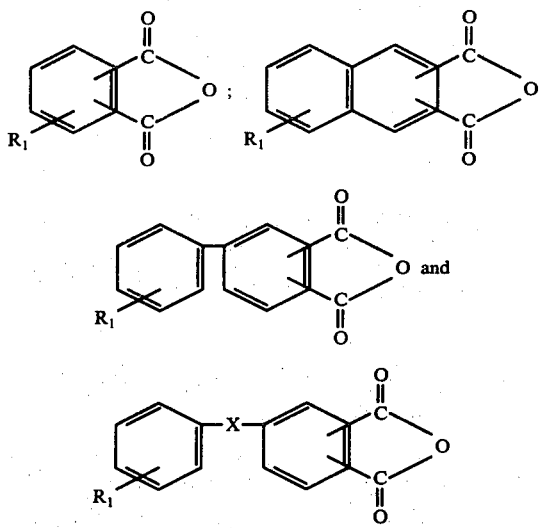

wherein $R_1$ represents a group selected from the class consisting of carboxyl and the group

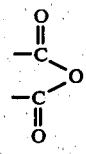

wherein the carbon atoms of the latter are each attached to adjacent carbon atoms in an aromatic ring, and wherein X is a bridging group selected from the class consisting of lower-alkylene, carbonyl, sulfonyl and oxygen. The term "lower-alkylene" means alkylene containing from 1 to 6 carbon atoms, inclusive, such as methylene, ethylene, 1,3-propylene, 1,4-butylene, 2,3-butylene, 1,6 hexylene and the like. A particularly preferred group consists of, benzophenone-3,3',4,4'-tetracarboxylic acid dianhydride, trimellitic anhydride, and mixtures thereof containing from about 10 to about 90 mole percent of benzophenone-3,3',4,4'-tetracarboxylic acid dianhydride and from about 90 to about 10 mole percent of trimellitic anhydride.

It is to be understood that mixtures of the aforesaid intramolecular anhydrides with the dicarboxylic acid compounds hereinbefore set forth are within the scope of the present invention. A particularly preferred mixture consists of about 80 mole percent of trimellitic anhydride and 20 mole percent of isophthalic acid.

The diisocyanates which can be employed in the process of the invention include any of the known diisocyanates. Illustrative of the diisocyanates which are employed in the process of the invention are: 2,4-toluene diisocyante, 2,6-toluene diisocyanate, 4,4'-methylenebis(phenylisocyanate), dianisidine diisocyanate, tolidine diisocyanate, 4,4'-diphenylether diisocyanate, 4,4'-methylenebis(cyclohexylisocyanate), m-xylene diisocyanate, 1,5-naphthalene diisocyanate, and the like. A preferred group of diisocyanates consists of, 2,4-toluenediisocyanate, 2,6-toluenediisocyanate (and mixtures thereof), 4,4'-methylenebis(phenylisocyanate) (MDI), and various mixtures of MDI with the toluenediisocyanates. A preferred mixture consists of from about 10 to about 35 mole percent of 4,4'-methylenebis(phenylisocyanate) and from about 65 to about 90 mole percent of a member selected from the group consisting of 2,4-toluenediisocyanate, 2,6-toluenediisocyanate, and mixtures thereof.

A particularly preferred mixture consists of about 20 mole percent of 4,4'-methylenebis(phenylisocyanate) and about 80 mole percent of a member selected from the group consisting of 2,4-toluenediisocyanate, 2,6-toluenediisocyanate, and mixtures thereof.

The proportions of diisocyanate to difunctional polycarboxylic compound employed in the process of the present invention are from about 1.0 mole to about 1.10 mole per mole of polycarboxylic compound, and preferably from about 1.0 mole to about 1.05 mole.

Upon completion of the polymerization reaction the polymer can be left in solution to be used thereafter without any further treatment. In an alternative embodiment, the polymer is isolated in solid form by standard methods known to those skilled in the polymer art. In particular, it is precipitated by pouring the polymer solution into rapidly stirred water, collection of the powdered polymer, followed by washing with water and/or non-solvents, and finally drying to the finished material. It will be recognized by those skilled in the art that isolation of the polymer by precipitation in water will automatically remove the trace amount of catalyst to be found therein. In an optional, and preferred step, the basic catalyst present in the final solution is neutralized by the addition of a minor amount of an acid, preferably a weak acid such as glacial acetic acid. Such a neutralization step obviates any difficulties that may be encountered when the reaction solution of the polymer is to be used directly, e.g. in the making of films, fibers, or coatings.

The polymers prepared by the process of the invention can be employed in any of the uses to which high temperature resistant polyimides or polyamides are currently put in the art. For example, the polymers of the invention in solid form can be molded in the form of bushings, seal faces, electric insulators, compressor vanes and impellers, pistons and piston rings, gears, thread guides, cams, brake lining, clutch faces, abrasive articles and the like. They can be employed in solution in the preparation of coating compositions and can thereby be employed in wire coating and in the casting or spraying of polymer films on a variety of substrates such as metal, ceramic, fabrics, polymerics and the like.

Indeed, as the polymers prepared by the process of the invention form high molecular weight polymers soluble in organic solvents they represent a particularly useful advance in the art since they provide a means of molding or fabricating high temperature resistant polymers, including fibers, without the need to carry out a final chemical reaction to produce the polymer in situ. The polymers also find particular utility in the manufacture of articles having reinforcing or modifying fillers and the like incorporated therein, including the making of high temperature resistant laminates. Thus, fillers such as fiberglass, carbon fibers, graphite, molybdenum disulfide (to impart lubricity), powdered metals such as aluminum, copper and the like, and abrasive materials (for producting grinding wheels and the like) can be added to solutions of the soluble copolyimides of the invention and intimately mixed therewith prior to removal of solvent followed by heat pressing or like techniques necessary to achieve production of the desired article. Other processing advantages which accrue from the high temperature resistance, solvent solubility and thermoplasticity of these copolyimides of the invention will be apparent to one skilled in the art.

The following examples describe the manner and process of making and using the invention and set forth the best mode contemplated by the inventors of carrying out the invention but are not to be construed as limiting.

EXAMPLE 1

A dry 500 ml. resin flask equipped with a stirrer, condenser, thermometer, nitrogen inlet tube, and addition funnel was charged with 64.4 g. (0.2 mole) of commercial grade (97.44% anhydride) 3,3',4,4'-benzophenonetetracarboxylic acid dianhydride (BTDA) and 0.05 g. (0.000915 mole of sodium methoxide catalyst. The flask contents were dissolved in 234 g. of dry dimethylformamide (distilled over calcium hydride). The temperature of the contents was raised to 80° C and, during constant stirring under nitrogen, a solution consisting of 10.0 g. (0.04 mole) of 4,4'-methylenebis(-phenylisocyanate) (MDI) and 28.0 g. (0.16 mole) of 2,4-toluenediisocyanate (TDI) dissolved in 30 g. of dry dimethylformamide DMF) was added dropwise over 4.5 hours. At the end of this time, infrared analysis of a sample of the viscous solution revealed only a trace amount of unreacted isocyanate (—NCO) and anhydride groups. An additional 2 mole percent excess [0.0008 mole (0.2 g.) of MDI and 0.0032 mole (0.56 g.) of TDI] of a mixture of the diisocyanates dissolved in 30 g. DMF was added over 1 hour. Approximately 6.5 hours from the beginning of the polymerization, IR analysis revealed no unreacted —NCO or anhydride. The DMF solution, having an inherent viscosity, $\eta inh$ (0.5% at 29.1° C) = 0.41, consisting of approximately 25 percent by weight of copolyimide, was characterized by a structure wherein approximately 80 percent of the recurring copolyimide units had the formula

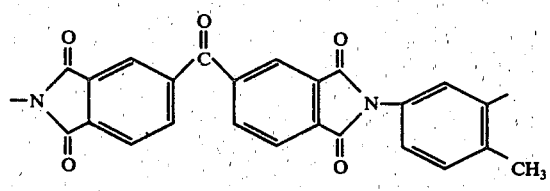

and the remaining 20 percent of the recurring units had the formula

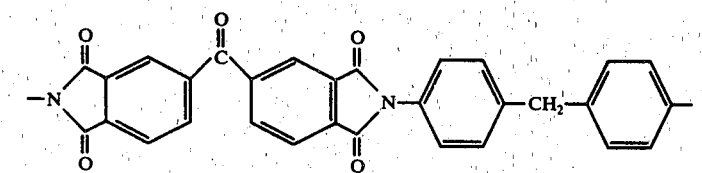

EXAMPLE 2

The following example is an uncatalyzed polymerization reaction that was not carried out in accordance with the present invention but is shown for purposes of comparison.

Using the procedure and reactants set forth in Example 1 except for the fact that no catalyst was used, the polymerization described therein was repeated. At the reaction temperature of 80° C after 8.75 hours, IR analysis showed an appreciable quantity of NCO and anhydride groups remaining. Further, the solution which was 25 percent by weight in solids was quite turbid which was a result of the preferential reaction of the more reactive MDI to form the homo-polyimide which is known to be insoluble, thereby leaving at least a portion of the TDI unreacted.

EXAMPLE 3

The following example is a polymerization reaction carried out in the presence of a known catalyst for the reaction of an isocyanate with an anhydride (see J. Drapier, et. al., Tetrahedron Letters No. 6, 419–422, 1973) but not a catalyst according to the present invention.

Using the procedure and reactants set forth in Example 1, except that the DMF was replaced by 175 g. of dry distilled N-methylpyrrolidone (NMP), the quantities of reactants were reduced by one half, and 0.05 g. (0.00015 mole) of dicobalt octacarbonyl was employed as the catalyst. After a 7 hour reaction period at 80° C, strong bands in the IR absorption spectrum for —NCO and anhydride groups showed the polymerization was proceeding only at a slow rate. As in Example 2, the turbidity of the polymerization solution was an indication of the preferential formation of the insoluble MDI based polyimide. The dicobalt octacarbonyl did not catalyze the copolymerization process.

EXAMPLES 4 – 7

Using the procedure and reactants of Example 1 and substituting the catalysts set forth in Table I, the copolyimide according to Example 1 was obtained in DMF solution in each of the examples.

TABLE I

| | Catalyst (wt. in q.) | Polymer Content (% by wt.) |
|---|---|---|
| Ex. 4 | potassium phenoxide (0.12) | 25 |
| Ex. 5 | sodium phenoxide (0.10) | 25 |
| Ex. 6 | potassium methoxide (0.065) | 25 |
| Ex. 7 | potassium octoxide (0.17) | 25 |

EXAMPLE 8

A dry one liter resin flask equipped as in Example 1 was charged with 161 g. (0.5 mole) of purified BTDA, 0.2 g. (0.0037 mole) of sodium methoxide catalyst, and 456 g. of dry DMF. The mixture was raised to 80° C under constant stirring and positive nitrogen flow to provide a clear solution consisting of about 30 percent solids content. The addition funnel was charged with a solution consisting of 25.0 g. (0.1 mole) of MDI and 70.0 g. (0 4 mole) of a mixture consisting of 80 percent 2,4-TDI and 20 percent 2,6-TDI dissolved in 40 g. of DMF. The contents of the addition funnel were added dropwise over a 6 hour period at 80° C. IR analysis after 7 hours revealed only a trace of unreacted anhydride and no —NCO. An additional 0.25 g. (0.001 mole) of MDI and 0.70 g. (0.004 mole) of the 80/20 mixture of 2,4- and 2,6-TDI (which is equivalent to a 1 mole percent —NCO excess) was added over an additional 2 hour period at 80° C. The final DMF copolyimide solution was characterized by having an inherent viscosity, ηinh(0.5% at 29.6° C) = 0.665. There was thus obtained a copolyimide having the recurring unit

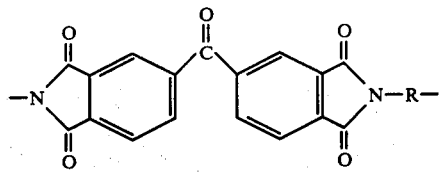

in which 80 percent of the recurring units R represented a mixture consisting of 80 percent

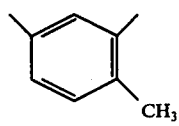

and 20 percent

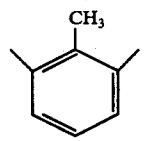

and in the remaining 20 percent of the recurring units R represented

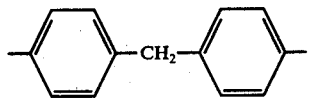

A portion of the solution was precipitated into water in a Waring Blendor thereby obtaining the copolyimide as a finely divided powder which was thoroughly dried under vacuum at 140° C and 0.5 mm. The powder upon dissolution in DMF had an ηinh (0.5% at 29.6° C) = 0.47 and NMP had an ηinh (0.5% at 29.6° C) = 0.58. Films were cast from the DMF solution of the copolyimide and then cured by either heating the film between the platens of a press that were at 250° C without the use of pressure, or else by curing in a vacuum oven at 180° C under about 1 mm pressure. Table II sets forth a comparison of the physical properties of the films cured by both of these methods.

TABLE II

| Comparison of Press and Vacuum Cured Film | | |
|---|---|---|
| | ‖ to film length | ⊥ to film length |
| Press cured: | | |
| Average thickness(mils) | 3.1 | 2.2 |
| Tensile Str.(psi) | 16,480 | 18,630 |
| Tensile Modulus(psi) | 400,060 | 312,720 |
| Elongation (%) | 4.7 | 3.4 |
| Vacuum cured: | | |
| Average thickness(mils) | 2.1 | |
| Tensile Str.(psi) | 17,110 | 19,800 |
| Tensile Modulus(psi) | 469,200 | 417,600 |
| Elongation (%) | 5.1 | 7.2 |

EXAMPLE 2

A dry 500 ml. resin flask equipped with a thermometer, stirrer, nitrogen inlet tube, condenser, and addition funnel was charged with 32.2 g. (0.1 mole) of purified BTDA and 19.2 g. (0.1 mole) of sublimed trimetallitic anhydride (TMA) dissolved in 200 g. of dry NMP along with 0.05 g. (0.0005 mole) of lithium phenoxide catalyst. During stirring and under a slight positive pressure of nitrogen the solution temperature was raised to 105° C and 17.4 g. (0.1 mole) of 2,4-toluenediisocyanate was added dropwise over a 1 hour period. Then, 25.0 g. (0.1 mole) of MDI dissolved in 25 g. of NMP was added dropwise over 6.5 hours at 105° C. At the end of the addition period the clear viscous solution was diluted with 77 g. of NMP thereby reducing the solids content to 20 percent by weight. The catalyst was neutralized by the addition of about 0.1 g. of glacial acetic acid to the solution. The NMP polymer solution was characterized by having an ηinh (0.5% at 29.6° C) = 0.91. There was thus obtained a block copolymer with respect to the isocyanates residue wherein approximatey 50 percent of the recurring units had the structure

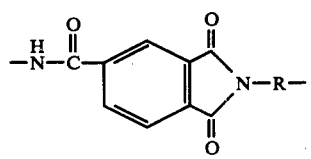

and the remaining 50 percent had the structure

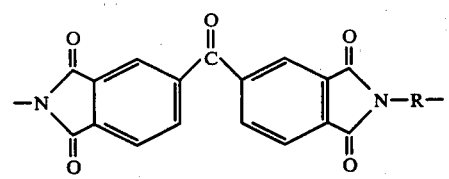

and further, wherein 50 percent of the recurring units were those in which R represented

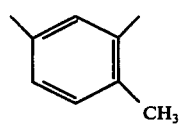

and the remainder were those in which R represented

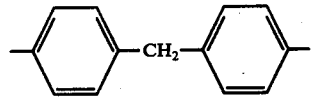

Films were easily cast from the NMP solution and possessed the following properties after vacuum curing in accordance with the conditions described in Example 8

| Tensile Str. (psi) | 15,960 |
|---|---|
| Tensile Modulus (psi) | 465,100 |
| Elongation (%) | 7.4 |

EXAMPLE 10

A dry 500 ml. flask equipped as described in Example 1 was charged with 38.4 g. (0.2 mole) of sublimed TMA and 0.08 g. (C.0015 mole) of sodium methoxide catalyst along with 244 g. of NMP (dried by distillation from calcium hydride). The temperature of the solution was raised to 115° C while the solution was stirred under nitrogen. The additional funnel was charged with 51.0 g. (0.204 mole, a 2 mole percent excess) of MDI dissolved in 40 g. of NMP and the isocyanate solution was slowly added over 5 a further quantity of MDI, 1.0 g. (a further 2 mole percent excess) dissolved in 4 g. of NMP was added over a 2 hour period. The catalyst was neutralized by the addition of 0.2 g. of glacial acetic acid. The polymer solution was characterized by having an ηinh (0.5% at 30° C) = 0.69. There was thus obtained a polyamideimide having the recurring unit

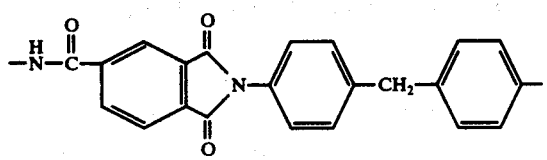

Films were cast from the NMP solution, and cured as previously described and the resulting films having an average thickness of 3 mils possessed the following properties

|  | ∥ to length | ⊥ to length |
| --- | --- | --- |
| Tensile Str. (psi) | 13,910 | 13,720 |
| Tensile Mod. (psi) | 397,100 | 363,900 |
| Elongation (%) | 8.8 | 7.7 |

EXAMPLE 11

A dry 500 ml. resin flask equipped as in Example 1 was charged with 30.75 g. (0.16 mole) of sublimed trimellitic anhydride, 6.65 g. (0.04 mole) of purified isophthalic acid, and 0.08 g. (0.0015 mole) of sodium methoxide catalyst. The contents were dissolved in 161 g. of dry NMP and the stirred solution heated to 120° C under nitrogen. A solution of 51.0 g. (0.204 mole) of MDI dissolved in 50 g. of NMP was added to the stirred solution at 120° C over a 4 hour period. At the end of this period an IR spectrum had no absorption bands for unreacted —NCO or anhydride. A solution of 0.2 g. of glacial acetic acid dissolved in 69 g. of NMP was added to the solution as it was cooling down resulting in a polymer solution having about 20 percent solids content and characterized by having an ηinh (0.5% at 30.4° C) = 0.74. There was thus obtained a copolyamideimide wherein 80 percent of the recurring units had the structure

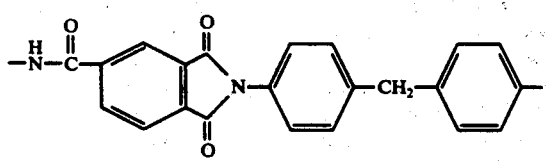

and the remaining 20 had the structure

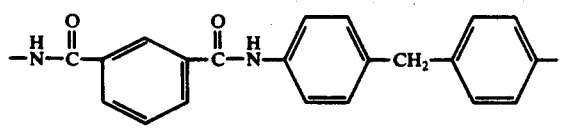

Films were cast and cured as previously described and possessed the following properties in the parallel and perpendicular direction to the film length.

|  | ∥ to length | ⊥ to length |
| --- | --- | --- |
| Tensile Str. (psi) | 13,600 | 15,050 |
| Tensile Mod. (psi) | 406,500 | 365,700 |
| Elongation (%) | 11.0 | 17.5 |

EXAMPLE 12

A dry 500 ml. resin flask equipped according to Example 1 was charged with 49.8 g. (0.3 mole) of purified isophthalic acid and 0.1 g. (0.0026 mole) of lithium methoxide. The flask contents were dissolved in 240 g. of dry NMP by stirring under nitrogen and the solution heated to 115° C. A solution consisting of 45.0 g. (0.18 mole) of MDI and 20.88 g. (0.12 mole) of a mixture of 80 percent 2,4-TDI and 20 percent 2,6-TDI dissolved in 28 g. of NMP was added to the flask at 115° C over a 6 hour period. An additional 0.84 g. (0.0048 mole) of the 2,4- and 2,6-TDI mixture along with 1.75 g. (0.0072 mole) of MDI were diluted with about 10 g. of NMP and added to the flask over a 2 hour period. The solution became very viscous and a solution of 0.2 g. of glacial acetic acid dissolved in 92 g. of NMP was added to reduce the solids content to about 20 percent. The polymer solution was characterized by having an ηinh (0.5% at 30° C) = 0.54. There was thus obtained a copolyamide having the recurring unit

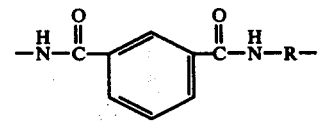

in which in 60 percent of the recurring units, R represented

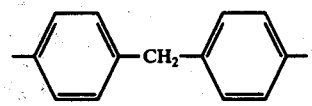

and, in the remaining 40 percent, R represented a mixture consisting of 80 percent

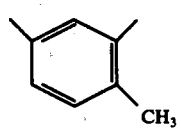

ps and 20 percent

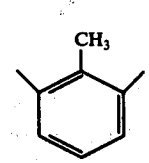

EXAMPLE 13 i

The following example is a polymerization reaction that was not carried out in accordance with the present invention.

Using the same procedure and reactants set forth in Example 12, the polymerization was repeated, however the catalyst was replaced by 0.126 g. (0.0006 mole) of the disodium salt of isophthalic acid. The same reaction conditions and excess of isocyanate as used in the previous example were employed in the present example. However, the films cast from the polymer solution were brittle and therefore the copolyamide so obtained was adjudged to be not of sufficiently high enough molecular weight to be useful.

Example 14

Using the same procedure and apparatus employed in Examle 12, the polymerization was repeated with the following exceptions. The purified isophthalic acid used was 53.15 g. (0.32 mole) along with 60.0 g. (0.24 mole) of MDI, 13.92 g. (0.08 mole) of 2,4-TDI and 0.08 g. (0.0015 mole) of sodium methoxide. The reaction time as 7 hours at 120° C followed by an additional 5 hours during which time a 5 mole percent excess of MDI was added. The resulting polymer solution was very viscous. There was thus obtained a copolyamide having the recurring unit as set forth in Example 12 in which, in 75 percent of the recurring units, R represented

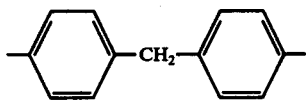

and, in the remaining 25 percent, R represented

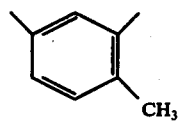

Films were cast from the solution and cured either by heating the film etween the platens of a press that were at 250° C without the use of pressure, or else by curing in a vacuum oven at 180° C under 1 mm pressure. The inherent viscosity of a sample of film dissolved in conc. $H_2SO_4$ was $\eta$inh (0.1% at 30.3° C)= 0.790.

Table III sets forth a comparison of the film properties prepared both ways.

TABLE III

| Comparison of Press and Vacuum Cured Film | | |
|---|---|---|
| | ‖ to film length | ⊥ to film lemngth |
| Press cured: | | |
| Average thickness(mils) | 2.8 | |
| Tensile Str.(psi) | 13,040 | 13,420 |
| Tensile Modulus(psi) | 459,800 | 413,200 |
| Elongation (%) | 5.8 | 6.7 |
| Vacuum cured: | | |
| Average thickness(mils) | 3.1 | |
| Tensile Str.(psi) | 13,850 | 13,070 |
| Tensle Modulus(psi) | 445,500 | 380,900 |
| Elongation (%) | 7.1 | 9.2 |

EXAMPLE 15

A dry 500 ml. resin flask equipped as in Example 1 was charged with 48.82 g. (0.2 mole) of purified brassylic acid, and 0.08 g. (0.0015 mole) of sodium methoxide dissolved in 200 g. of dry NMP. The temperature was raised to 115° C and 50.0 g. (0.2 mole) of MDI dissolved in 44 g. of NMP was added dropwise over a 4 hour period. A 1 mole percent (0.5 g.) excess of MDI dissolved in 14 g. of NMP was added over 1 hour. Twelve drops of glacial acetic acid were added to the pale yellow solution to neutralize the catalyst. The polymer solution contained 24 percent by weight solids. The polymer was precipitated into water in a Waring Blendor, collected, washed with acetone, and finally dried by heating at 145° C in vacuum overnight. The polyamide was characterized by having an inherent viscosity in m-cresol of $\eta$inh (0.5% at 30° C)= 0.69. There was thus obtained a polyamide having the recurring unit

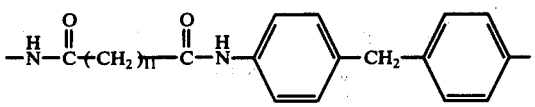

I claim:
1. In a process for preparing an essentially liner, dipolar/aprotic solvent soluble solid polyamideimide by the condensation of an organic diisocyanate with a compound contaning one carboxylic acid group and one intramolecular anhydride group or the free carboxylic acids thereof in said solvent, the improvement which comprises carrying out said process in the resence of a catalytic amount of a compound MOR, wherein R represents alkyl or aryl, and M is an alkali metal.

2. The process according to claim 1 wherein the solvent comprises a dipolar aprotic solvent.

3. The process according to claim 1 wherein the catalyst is lithium phenoxide.

4. The process according to claim 1 wherein the catalyst is lithium methoxide.

5. The process according to claim 1 wherein the catalyst is sodium methoxide.

6. The process according to claim 1 wherein the polycarboxylic acid derivative comprises an aromatic tricarboxylic acid anhydride.

7. In a process for preparing an essentially linear, dipolar aprotic solvent soluble solid polyamideimide by the condensation of an organic diisocyanate with a compound containing one carboxylic acid group and one intramolecular anhydride group or the free carboxylic acids thereof in said solvent, the improvement which comprises carrying out said process in the presence of a catalytic amount of a compound MOR, wherein R represents alkyl, and M is an alkali metal.

8. The process according to claim 7 wherein the polycarboxylic acid derivative is trimellitic anydride.

9. The process according to claim 7 wherein the polycarboxylic acid derivative comprises a mixture of about 80 mole percent of trimellitic anhydride and about 20 mole percent of isophthalic acid.

10. The process according to claim 9 wherein the diisocyanate is 4,4'-methylenebis(phenylisocyanate).

11. The process according to claim 10 wherein the dipolar aprotic solvent is N-methylpyrrolidone.

12. The process according to claim 11 wherein the catalyst is sodium methoxide.

* * * * *